United States Patent [19]
Maeda

[11] Patent Number: 5,598,078
[45] Date of Patent: Jan. 28, 1997

[54] DEVICE FOR DETECTING STEP-OUT OF A STEPPING MOTOR

[75] Inventor: Naoyuki Maeda, Inuyama, Japan

[73] Assignee: TRW Steering Systems Japan Co., Ltd., Aichi-ken, Japan

[21] Appl. No.: 285,179

[22] Filed: Aug. 3, 1994

[30] Foreign Application Priority Data

Aug. 4, 1993 [JP] Japan ................. 5-193584

[51] Int. Cl.⁶ .................................. H02K 29/04
[52] U.S. Cl. .................. 318/696; 318/805; 368/157
[58] Field of Search ................... 318/685, 696, 318/647, 650, 798–806, 439, 254, 138; 368/157

[56] References Cited

U.S. PATENT DOCUMENTS

| | | | |
|---|---|---|---|
| 4,196,462 | 4/1980 | Pohl | 318/782 X |
| 4,212,156 | 7/1980 | Kawamura et al. | 368/85 |
| 4,425,538 | 1/1984 | Berney | 318/696 |
| 4,460,282 | 7/1984 | Kanno | 368/157 |
| 4,507,599 | 3/1985 | Guerin | 318/696 |
| 4,551,665 | 11/1985 | Antognini et al. | 318/696 |
| 4,703,235 | 10/1987 | Wisner | 318/254 |
| 4,996,469 | 2/1991 | DeLange et al. | 318/757 |
| 5,119,671 | 6/1992 | Kopera | 73/116 |
| 5,164,649 | 11/1992 | Sarbach et al. | 318/685 |
| 5,287,050 | 2/1994 | Kronenberg et al. | 318/696 |

FOREIGN PATENT DOCUMENTS 1283099  11/1989  Japan.

*Primary Examiner*—Brian Sircus
*Attorney, Agent, or Firm*—Tarolli, Sundheim, Covell, Tummino & Szabo

[57] ABSTRACT

A device for detecting asynchronization or stepping out of a stepping motor without making the stepping motor large in size. Parallel resonance circuit LC is provided in a recovery circuit of stator coil RL of the stepping motor for detecting linking current IX. If the stepping motor is out of step, the magnetic resistance between stator and rotor increases while the reactance of stator coil RL decreases. When motor drive current ID is turned off, a large transient current is momentarily generated yet is quickly dampened. While the motor drive current ID is off, linking current IX approaches zero. Consequently, if the stepping motor is out of step, there is no substantial difference in the linking current IX when motor drive current ID is turned on from when motor drive current ID was off. Also, the amplitude of the transient or resonance waveform is smaller than the amplitude when the stepping motor is operating normally. By thus detecting the resonance waveform of the parallel resonance circuit when motor drive current ID is turned on, it can be precisely determined whether or not the stepping motor is out of step.

12 Claims, 8 Drawing Sheets

DEVICE FOR DETECTING STEP-OUT OF A STEPPING MOTOR

FIELD OF THE INVENTION

This invention relates to a device for detecting asynchronization or stepping out of a stepping motor. In particular, a recovery circuit is provided to detect recovery circuit voltage or current. The voltage or current is then compared to a reference voltage or current to determined whether the stepping motor is out of step.

BACKGROUND OF THE INVENTION

Previous devices, as disclosed in the Japanese Laid-open Patent Application No. 1-283099, have an encoder attached to the rotor of the stepping motor. However, a problem with these devices exists in that if the rotor vibrates without rotating, the device indicates that the stepping motor is out of step.

In these prior-art devices, however, a mechanical connector forming a closed loop must be present between the stepping motor and the encoder to feed detection signals from the encoder back to the stepping motor. As a result, the stepping motor is unfavorably large in size.

In an electric power steering system using the stepping motor, for example, the large size of the stepping motor restricts the location of the power steering component parts, and increases costs as a result.

SUMMARY OF THE INVENTION

Wherefore, an object of this invention is to provide a step-out device which can precisely detect the stepping-out of a stepping motor, while the size of the stepping motor is reduced.

To attain this and other objects, the present invention provides a device for detecting the step-out of a stepping motor equipped with detection means (detector) and determination means (comparator). The detection means detects the current or voltage of the recovery circuit for feeding the counterelectromotive force, which was generated in the stator coil of the stepping motor, back to the stator coil as a recovery current. The determination means compares the current or voltage detected by the detection means to the specified reference current or voltage to determine the existence of a step-out.

The present invention differs from the prior art in that in the present invention, the current or voltage of the recovery circuit is detected, thereby obviating the mechanical connection and allowing changes in location of the power steering component parts if necessary.

When the motor drive current to the stator coil turns on or off, transients are produced, shown as resonance waveforms, in the counterelectromotive force of the stepping motor. The present invention utilizes this phenomenon where the detection means detects this resonance waveform in the LC parallel resonance circuit provided in the recovery circuit and the determination means determines whether the stepping motor is out of step, based on the resonance waveform detected by the detection means at the transient time when the motor drive current to the stator coil turns on or off.

Alternatively, the detection means can detect the current or voltage in the recovery circuit when the circuit contains a resistor in place of the LC parallel resonance circuit. The determination means then determines whether the stepping motor is out of step, based on the current or voltage detected by the detection means during the period of time from when the motor drive current to the stator coil turns off to when it turns on.

Figure 1A:
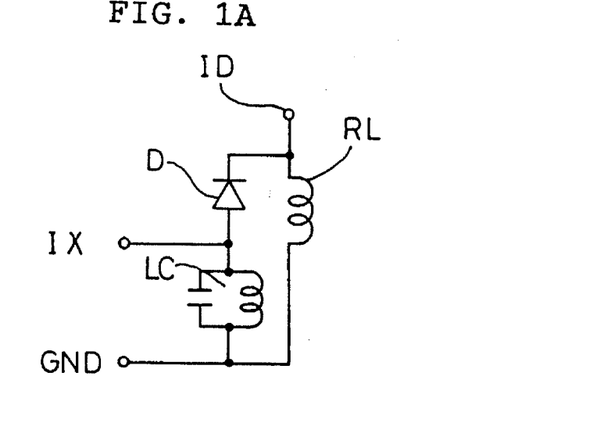
FIGS. 1A and 1B are explanatory views of the circuit and operation according to a portion of the first embodiment of the invention.

In the invention, when parallel resonance circuit LC is provided in the recovery circuit of stator coil RL of the stepping motor, as shown in FIG. 1A, the linking current IX of the parallel resonance circuit LC is detected. As shown by the solid line in FIG. 1B, when motor drive current ID turns off, linking current IX exhibits a negative transient or negative resonance waveform. When motor drive current ID turns on, linking current IX exhibits a positive transient or positive resonance waveform. This indicates that the stepping motor is operating normally and is shown by the solid line of FIG. 1B.

If the stepping motor falls out of step, the magnetic resistance between the stator and the rotor increases. Therefore, the reactance of stator coil RL decreases while the motor drive current ID increases. If this increased motor drive current ID is turned off, as shown by the dashed line in FIG. 1B, a large transient current is momentarily generated. The transient is quickly dampened and the linking current IX approaches zero while motor drive current ID is off.

Figure 1B:
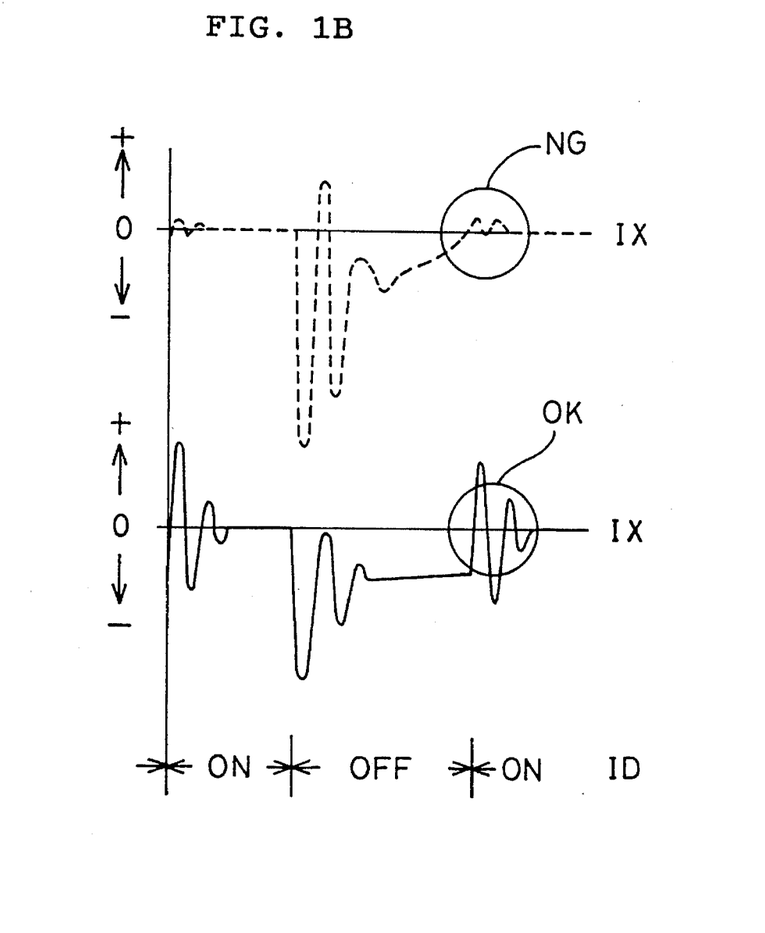

Consequently, it is seen by comparing circle NG with circle OK in FIG. 1B that there is no substantial difference in linking current IX when motor drive current ID turns on from when motor drive current ID was off. Also, as seen in circle NG, the resonance waveform shows only a small amplitude, rather than the comparatively large amplitude of transient or resonance waveform seen in circle OK of a normally operating stepping motor. By using such phenomenon, specifically, by detecting the resonance waveform of parallel resonance circuit LC when the motor drive current ID to stator coil RL is turned on, it can be precisely determined whether or not the stepping motor is out of step.

On the other hand, when the motor drive current ID to stator coil RL is turned off, the amplitude of the resonance waveform, when the stepping motor is out of step as shown by the dashed line in FIG. 1B, is larger than the amplitude of the resonance waveform when the stepping motor is operating normally as shown by the solid line in FIG. 1B. Therefore, by detecting the resonance waveform of parallel resonance circuit LC when the motor drive current ID to stator coil RL is turned off, it can be precisely detected whether the stepping motor is out of step.

Figure 2A:
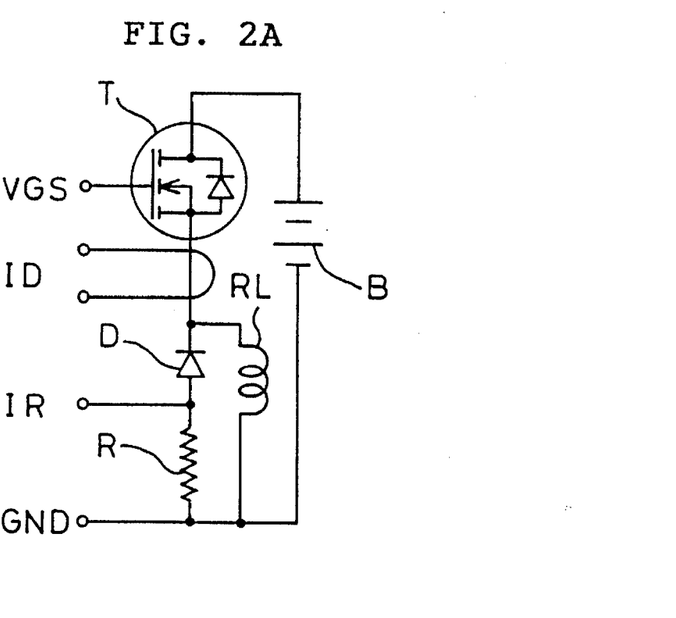
FIGS. 2A and 2B are explanatory views of the circuit and operation according to a portion of the second embodiment of the invention.
Figure 2B:
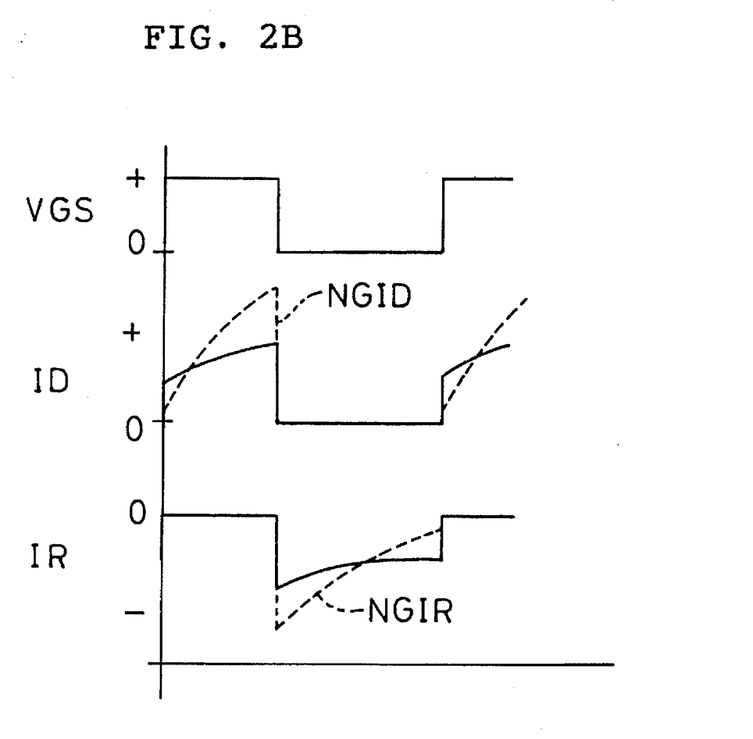

Alternatively, as shown in FIG. 2A, according to the invention, shunt resistance R is provided in the recovery circuit of stator coil RL in place of parallel resonance circuit LC and recovery current IR is detected rather than linking current IX. As shown in FIG. 2B, recovery current IR falls lower than usual (NGIR) when pulse voltage VGS turns off. The reduced amount of recovery current IR corresponds to the increase of motor drive current ID. Therefore, for example, when the stepping motor is out of step, the increase in motor drive current ID, as shown by dashed line NGID, corresponds to the decrease in recovery current IR, as shown by dashed line NGIR, when drive current ID turns off. Therefore, the value of recovery current IR when drive current ID turns off can be the reference value for use as a comparison for determining whether the stepping motor is out of step. As shown in FIG. 2B, while motor drive current ID is off, the dashed and solid lines of recovery current IR intersect each other at only one point and are different in value from each other at the other points. Therefore, at all times, excluding the intersection point, while motor drive current ID is off, as well as immediately after motor drive current ID turns off, by comparing the detected value of recovery current IR (dashed line) with the reference value of recovery current IR when the stepping motor is normally operating (solid line), it can be determined whether or not the stepping motor is out of step.

Alternatively, by detecting the peak value of motor drive current ID, it can be determined whether or not the stepping motor is out of step. For this purpose, a resistance must be provided in the motor drive current. However, since electric power is consumed by this resistance, this alternative is disadvantageous.

Instead, the provision of a resistance in the recovery circuit of counterelectromotive force advantageously reduces the loss in energy.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 3:
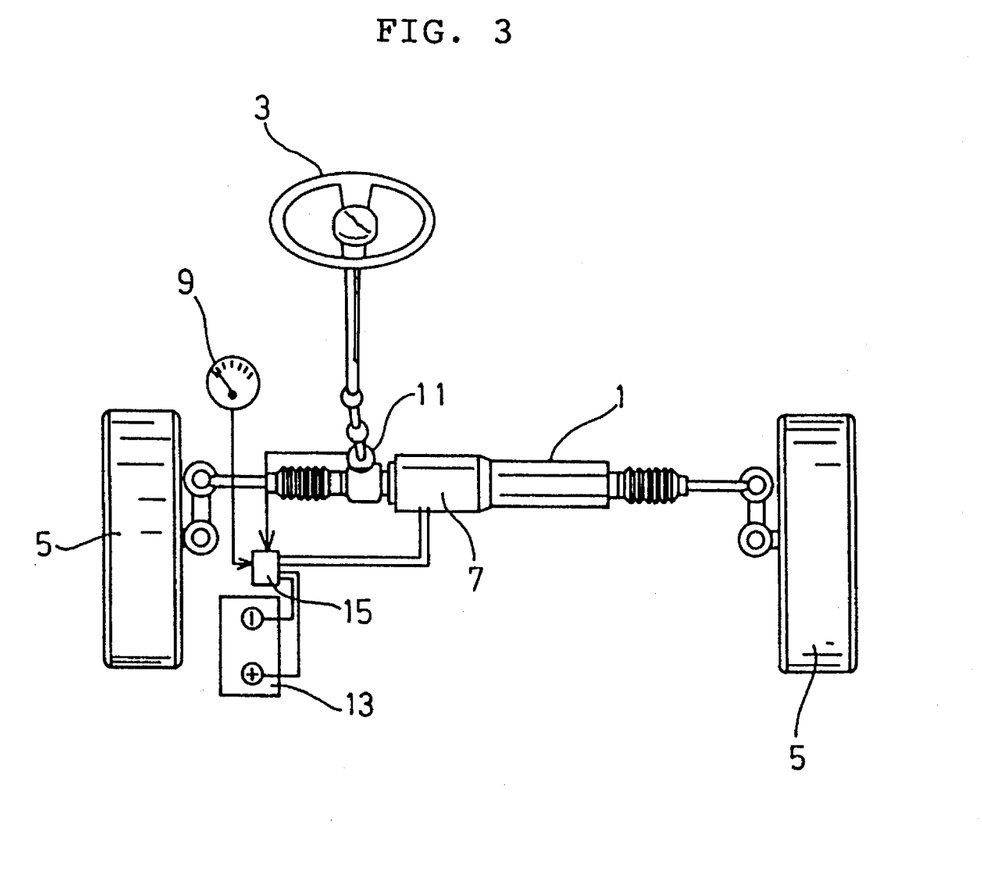
FIG. 3 is a diagram showing an electrically driven power steering unit embodying the invention.

An electrically driven power steering unit, as shown in FIG. 3, has a rack and pinion mechanism in a gear housing 1. The steering force applied to a steering wheel 3 is transmitted via the rack and pinion mechanism to vehicle wheels 5. The power steering unit is also provided with an electrically driven power assisting mechanism. The assisting mechanism is provided with a stepping motor 7 for applying an assisting drive force to the rack and a controller 15 for feeding electric power from a battery 13 to the stepping motor 7 in response to output signals from a vehicle speed sensor 9 and a torque sensor 11.

Figure 4:
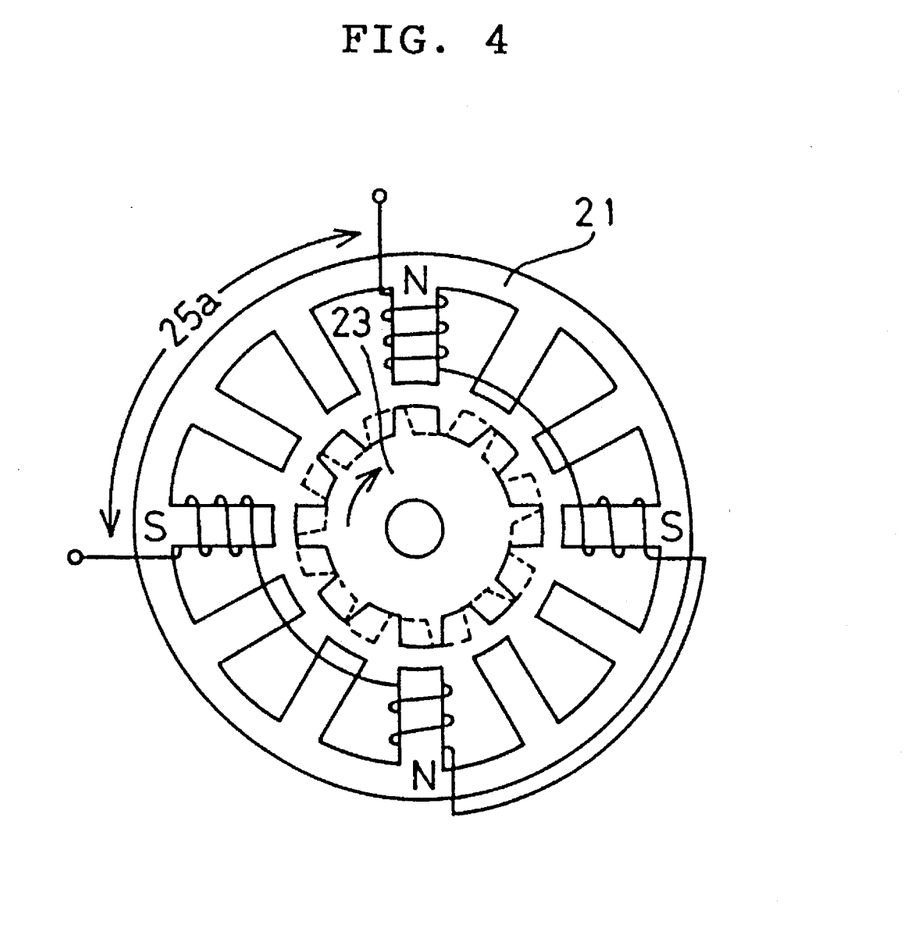
FIG. 4 is a diagram showing a stepping motor used in the electrically driven power steering unit shown in FIG. 3.

The stepping motor 7, as shown in FIG. 4, is provided with a stator 21 having twelve teeth and a rotor 23 having eight teeth. Three coils are wound around the twelve teeth of the stator 21 such that a coil is wound around every third tooth. For clarity, only a single coil 25a is shown in FIG. 4. Coil 25b is also wound around every third tooth starting from the tooth adjacent to the starting tooth of coil 25a. Coil 25c is wound around in a similar manner. When the stepping motor 7 is normally operating, the rotor 23 is in the position shown by the solid line in FIG. 4. If the stepping motor 7 is out of step, however, as shown by the dashed line in FIG. 4, the teeth of rotor 23 remain out of step from the teeth of stator 21 while electric power is provided.

Figure 5:
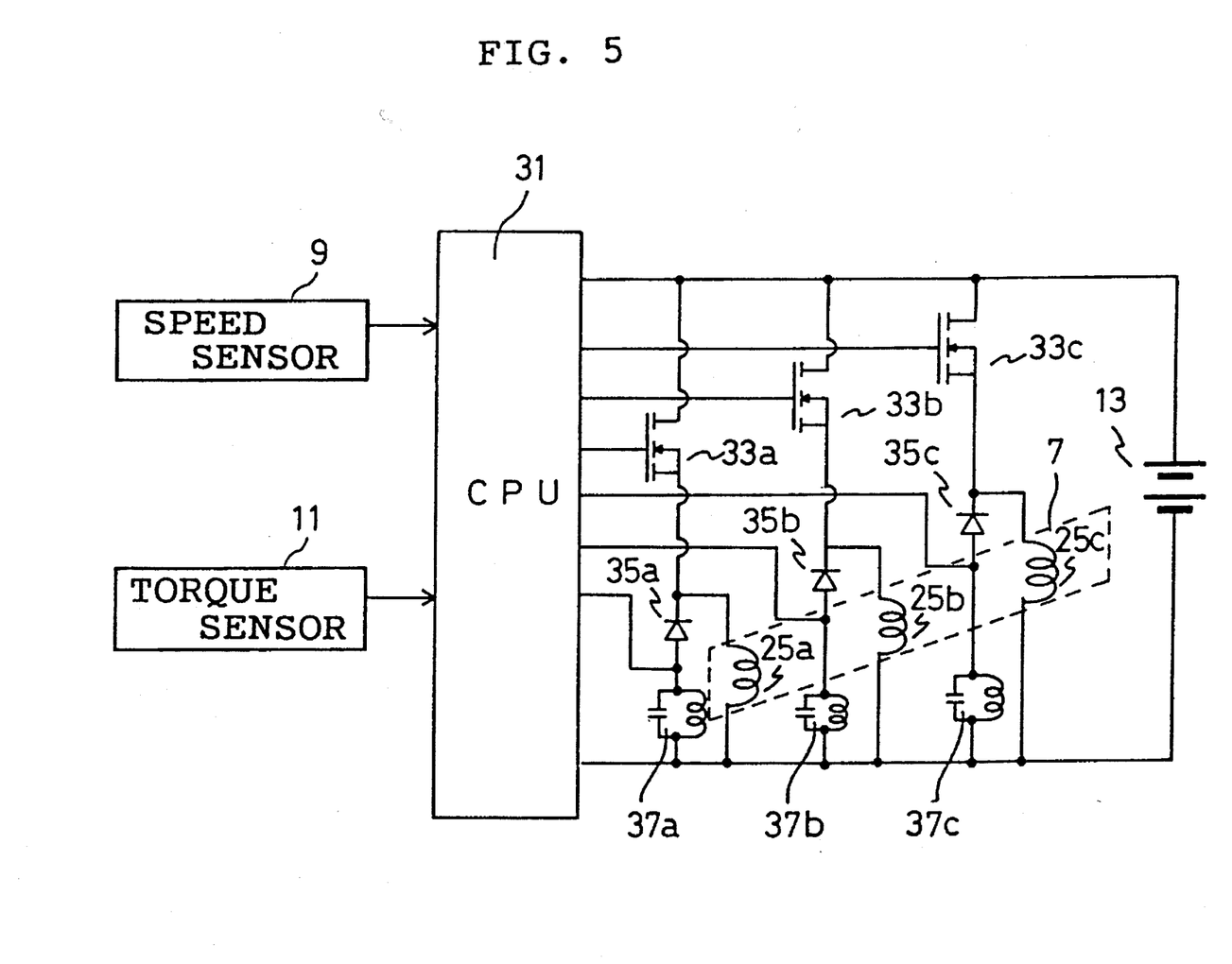
FIG. 5 is a block diagram showing a stepping motor drive circuit and a step-out detecting circuit of the first embodiment.

The controller 15 is a computer provided with a CPU 31. As shown in FIG. 5, the CPU 31 is connected to the battery 13 and to the coils 25a, 25b and 25c of the stepping motor 7. The CPU 31 is connected to the coils 25a, 25b and 25c via MOSFET 33a, 33b and 33c, respectively. The voltage from the battery 13 is supplied through MOSFETs 33a, 33b and 33c to the coils 25a, 25b and 25c, respectively, in response to the detected vehicle speed of speed sensor 9 and steering torque of torque sensor 11. Diodes 35a, 35b and 35c and LC parallel resonance circuits 37a, 37b and 37c are also connected to the recovery circuit for controlling the counter-electromotive force. The linking current IX generated in the LC parallel resonance circuits 37a, 37b and 37c is detected by the CPU 31.

Figure 6:
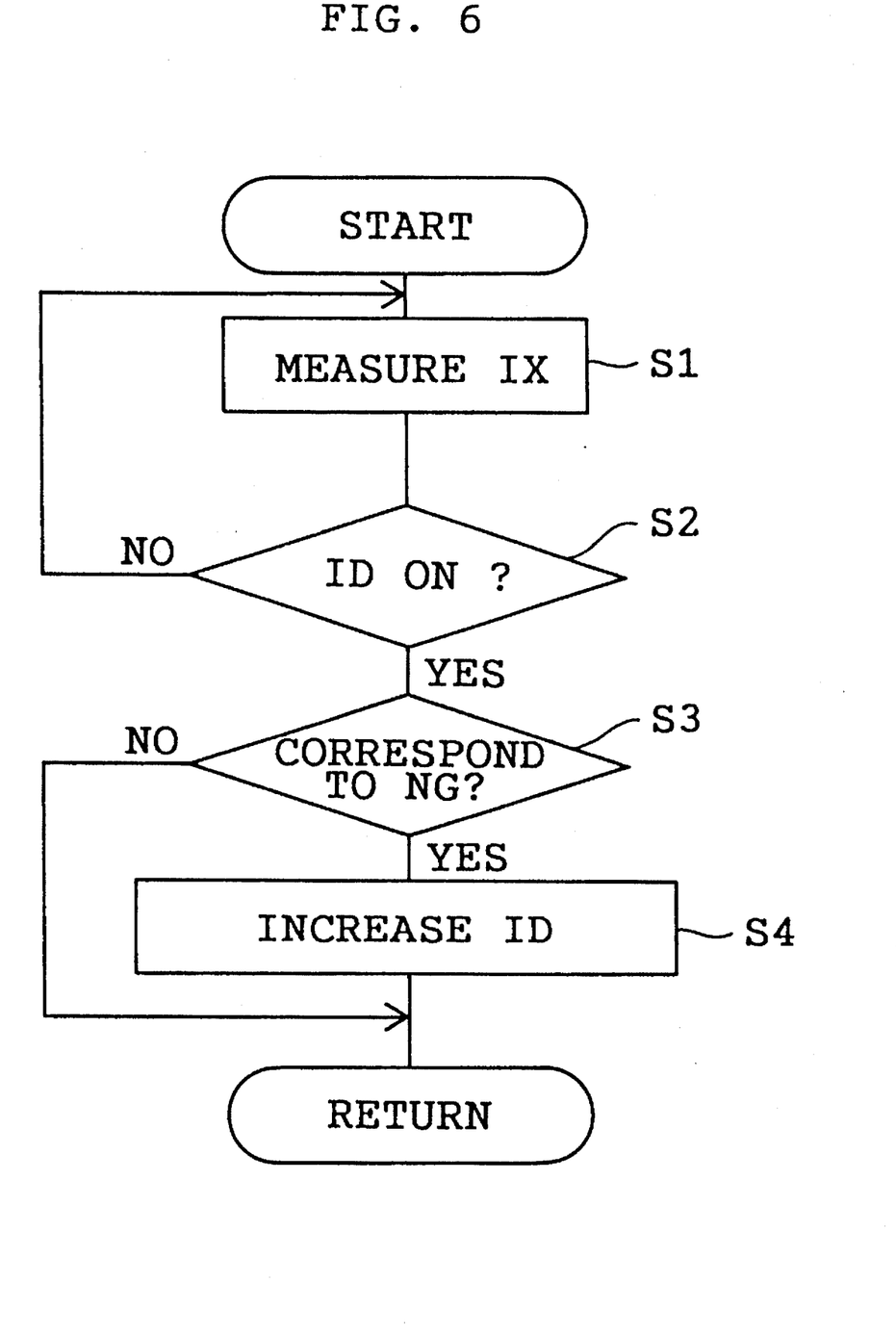
FIG. 6 is a flow chart showing the progress of the step-out detection of the first embodiment.

The flow chart of FIG. 6 shows the CPU 31 process steps for determining whether or not the stepping motor 7 is out of step, using the LC parallel resonance circuit 37a and the coil 25a. At step S1, the linking current IX is measured from the LC parallel resonance circuit 37a. Subsequently, at step S2, it is determined whether or not the supply of motor drive current ID to the coil 25a is turned on. If the answer to step S2 is affirmative, it is detected at step S3 whether the amplitude of resonance waveform of linking current IX corresponds to circle OK or to circle NG as shown in FIG. 1B. If the amplitude corresponds to circle NG, it is then determined that the stepping motor 7 is out of step. Subsequently, at step S4, motor drive current ID is increased to correct the step-out and return the stepping motor 7 to normal operation. The same process steps are repeated for the LC parallel resonance circuits 37b, 37c and the coils 25b, 25c, respectively.

The motor drive current ID is controlled in response to output signals from the vehicle speed sensor 9 and the torque sensor 11 in the same way as in the known electrically driven power steering unit. Specifically, as the vehicle speed increases, the assisting drive force is decreased.

As aforementioned, with reference to the first embodiment, the resonance waveform of the LC parallel resonance circuits 37a, 37b and 37c provided in the recovery circuit is detected at a specified time to determine whether the stepping motor 7 is out of step. Therefore, the steering unit of the invention is reduced in size allowing variation in the location of the power steering component parts.

Figure 7:
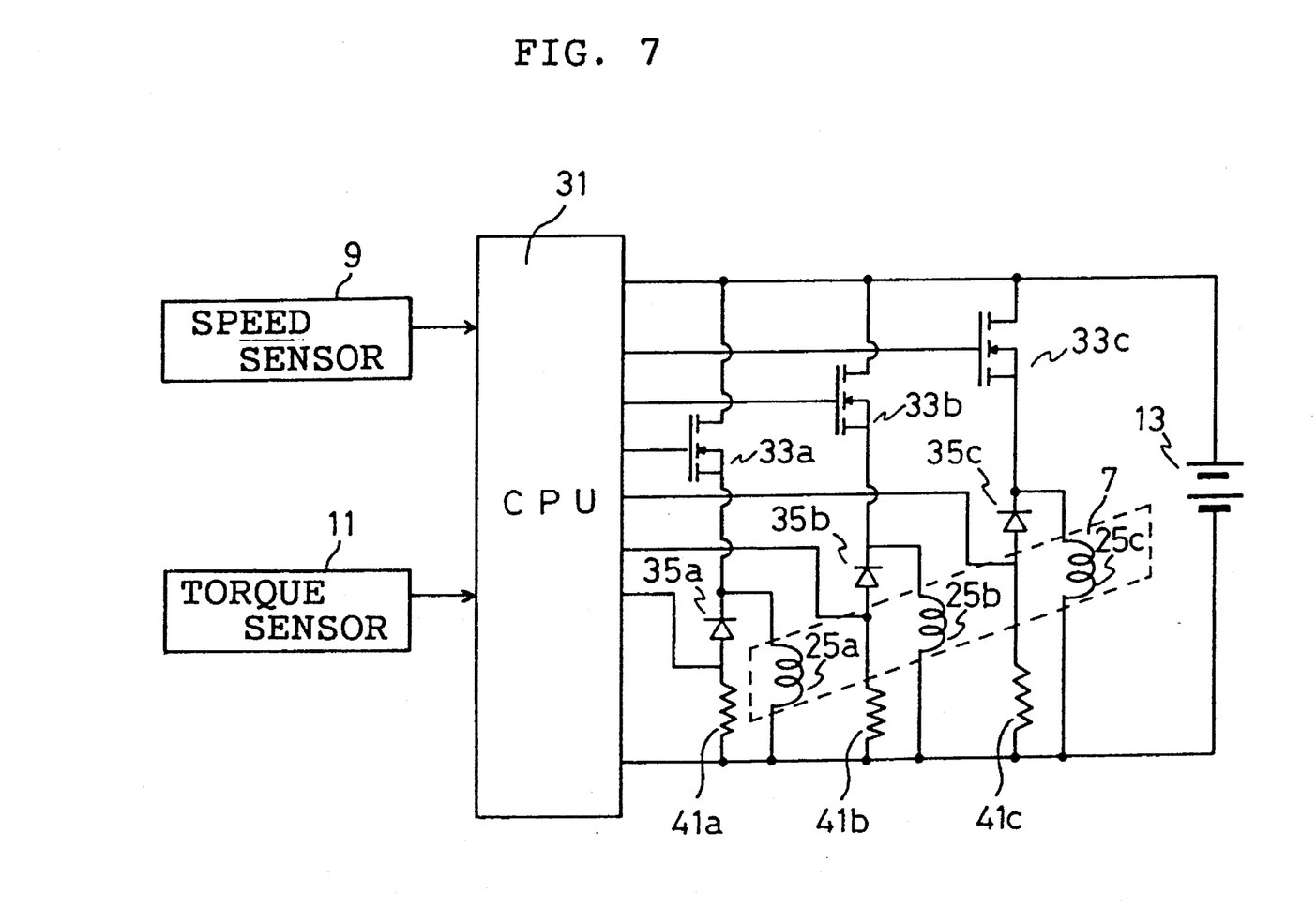
FIG. 7 is a block diagram showing a stepping motor drive circuit and a step-out detecting circuit of the second embodiment; and, FIG. 8 is a flowchart showing the progress of the step-out detection of the second embodiment.

As shown in FIG. 7, the second embodiment is different from the first embodiment only in that shunt resistances 41a, 41b and 41c replace the LC parallel resonance circuits 37a, 37b and 37c. Recovery current IR is measured from the shunt resistances 41a, 41b and 41c by the CPU 31.

Figure 8:
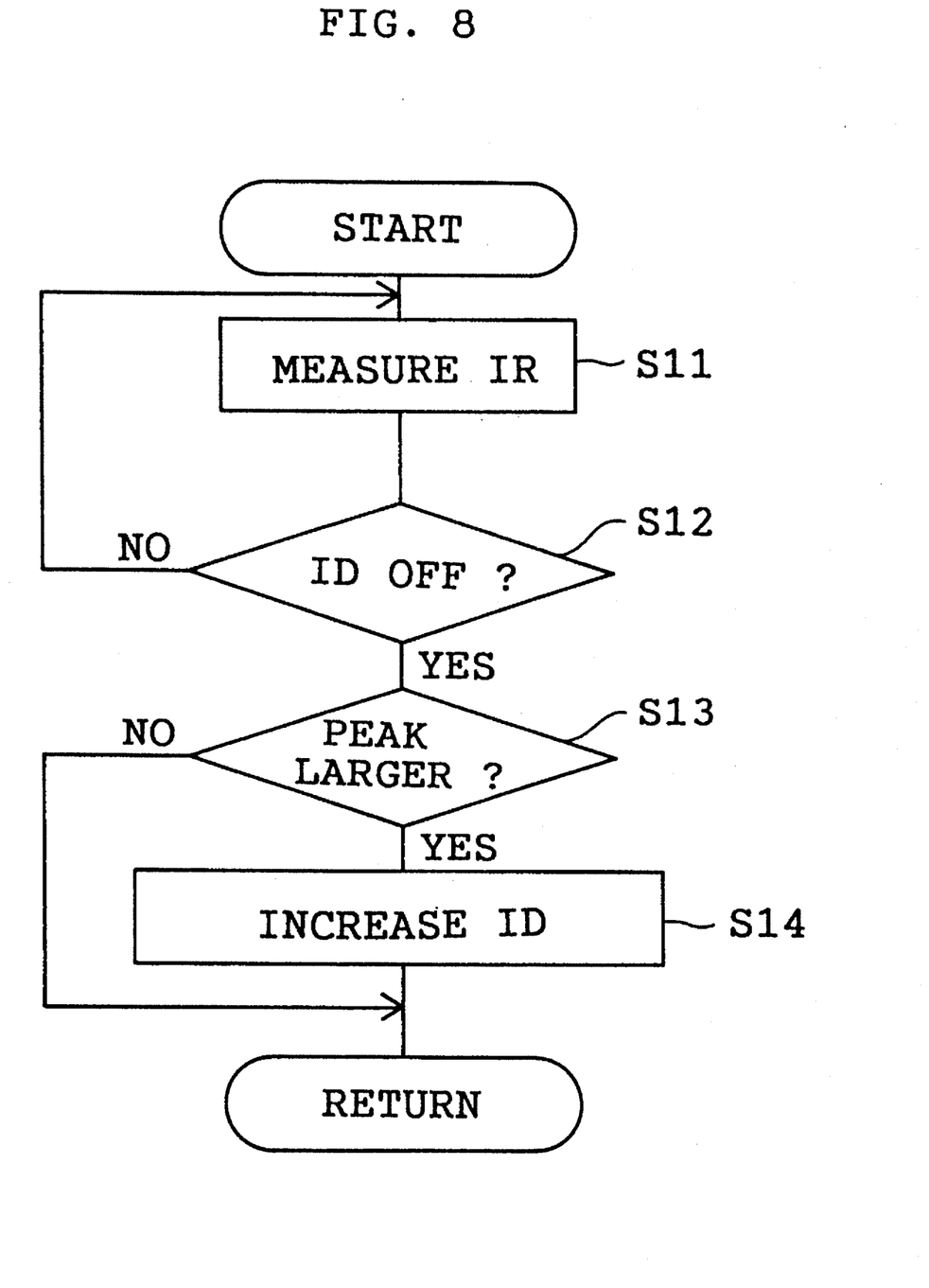

As shown in the flow chart of FIG. 8, in the second embodiment, at step S11, recovery current IR is measured from the shunt resistance 41a. Subsequently, at step S12, it is determined whether or not motor drive current ID to the coil 25a is turned off. If the answer to step S12 is affirmative, it is detected, at step S13, whether or not the peak value of recovery current IR is larger than the reference value of recovery current IR. If the peak value is larger than the reference value, it is then determined that the stepping motor 7 is out of step. Subsequently, at step S14, motor drive current ID is increased to correct the step-out and return the stepping motor 7 to normal operation. The same process steps are repeated for the shunt resistances 41b, 41c and the coils 25b, 25c, respectively.

As in the first embodiment, the power steering unit of the second embodiment is smaller in size as compared with the conventional unit having the encoder. Again, this reduced size allows variation in the location of the power steering component parts.

This invention has been described above with reference to the preferred embodiments as shown in the figures. Modifications and alterations may become apparent to one skilled in the art upon reading and understanding the specification. Despite the use of the embodiments for illustration purposes, the invention is intended to include all such modifications and alterations within the spirit and scope of the appended claims.

What is claimed is:

1. A device for detecting step-out of a stepping motor having a stator coil comprising:

detecting means for detecting at least one of current and voltage of a recovery circuit, said recovery circuit being connected in parallel with the stator coil, said recovery circuit exhibiting signals indicative of switching transient of said stator coil, said signal indicative of switching transient being indicative of a step-out condition; and determining means for comparing said at least one of detected current and voltage signals indicative of said switching transient to a corresponding one of a reference current and voltage;

said recovery circuit comprising an LC parallel resonance circuit.

2. A device for detecting step-out of a stepping motor having a stator coil comprising:

a recovery circuit connected in parallel with the stator coil, said recovery circuit exhibiting signals indicative of switching transients of said stator coil, said signal indicative of switching transients being indicative of a step-out condition;

a detector in communication with said recovery circuit to gauge at least one of current and voltage of said recovery circuit indicative of switching transients of said stator coil; and a comparator coupled to said detector indicative of a step-out of the stepped motor;

said recovery circuit comprising an LC parallel resonance circuit.

3. The device as claimed in claim 2 wherein said recovery circuit comprises a resistor.

4. The device as claimed in claim 2 wherein said detector and comparator comprises a CPU.

5. A method for detecting step-out of a stepping motor having a stator coil comprising:

connecting a recovery circuit in parallel with the stator coil, said recovery circuit exhibiting signals indicative of switching transients of said stator coil, said signal indicative of switching transients being indicative of a step-out condition; and comparing said at least one of detected current and voltage signals indicative of said switching transients to a corresponding one of a reference current and voltage;

said step of connecting said recovery circuit comprising connecting an LC parallel resonance circuit.

6. The method as claimed in claim 5 wherein said step of connecting said recovery circuit comprises connecting a resistor.

7. The method as claimed in claim 5 wherein said detecting step and said comparing step comprises using a CPU.

8. A device for detecting step-out of a stepping motor having a stator coil comprising:

detecting means for detecting at least one of current and voltage of a recovery circuit, said recovery circuit being in series with a diode, said recovery circuit and said diode being in parallel with the stator coil, said recovery circuit exhibiting signals indicative of switching transient of said stator coil, said signal indicative of switching transient being indicative of a step-out condition; and determining means for comparing said at least one of detected current and voltage signals indicative of said switching transient to a corresponding one of a reference current and voltage.

9. The device as claimed in claim 8 wherein said recovery circuit comprises a resistor.

10. The device as claimed in claim 8 wherein said detecting means and determining means comprises a CPU.

11. A device for detecting step-out of a stepping motor having a stator coil comprising:

a recovery circuit connected in series with a diode, said recovery circuit and said diode being in parallel with the stator coil, said recovery circuit exhibiting signals indicative of switching transients of said stator coil, said signal indicative of switching transients being indicative of a step-out condition;

a detector in communication with said recovery circuit to gauge at least one of current and voltage of said recovery circuit indicative of switching transients of said stator coil; and a comparator coupled to said detector indicative of a step-out of the stepped motor.

12. A method for detecting step-out of a stepping motor having a stator coil comprising:

connecting a recovery circuit in series with a diode and connecting the recovery circuit and said diode in parallel with the stator coil, said recovery circuit exhibiting signals indicative of switching transients of said stator coil, said signal indicative of switching transients being indicative of a step-out condition; and comparing said at least one of detected current and voltage signals indicative of said switching transients to a corresponding one of a reference current and voltage.

\* \* \* \* \*